United States Patent [19]

Kimrey, Jr. et al.

[11] Patent Number: 5,321,223

[45] Date of Patent: Jun. 14, 1994

[54] METHOD OF SINTERING MATERIALS WITH MICROWAVE RADIATION

[75] Inventors: Harold D. Kimrey, Jr., Knoxville; Cressie E. Holcombe, Jr., Farragut; Norman L. Dykes, Oak Ridge, all of Tenn.

[73] Assignee: Martin Marietta Energy Systems, Inc., Oak Ridge, Tenn.

[21] Appl. No.: 781,781

[22] Filed: Oct. 23, 1991

[51] Int. Cl.$^5$ .............................................. H05B 6/64
[52] U.S. Cl. .................... 219/745; 219/744; 156/272.2; 264/26
[58] Field of Search ............... 219/10.55 M, 10.55 A, 219/10.55 R, 10.55 F; 264/25, 26, 27, 63, 64, 65, 66; 507/88-90, 97, 99; 423/594, 598, 633; 156/272.2; 106/39.5

[56] References Cited

U.S. PATENT DOCUMENTS

| | | | |
|---|---|---|---|
| 3,585,258 | 6/1971 | Levinson | 219/10.55 M |
| 4,147,911 | 4/1979 | Nishitani | 219/10.55 M |
| 4,207,306 | 6/1980 | Jarcho | 423/598 |
| 4,307,277 | 12/1981 | Maeda et al. | 219/10.55 R |
| 4,396,587 | 8/1983 | Yamaguchi et al. | 423/344 |
| 4,474,731 | 10/1984 | Browlow et al. | 264/63 |
| 4,529,856 | 7/1985 | Meek et al. | 219/10.55 M |
| 4,529,857 | 7/1985 | Meek et al. | 219/10.55 M |
| 4,540,677 | 9/1985 | Enomoto et al. | 501/88 |
| 4,559,429 | 12/1985 | Holcombe | 219/10.55 F |
| 4,560,669 | 12/1985 | Matsuhiro et al. | 264/65 |
| 4,572,844 | 2/1986 | Inoue et al. | 501/89 |
| 4,695,695 | 9/1987 | Meek et al. | 219/10.55 M |
| 4,743,340 | 5/1988 | Wrenn et al. | 162/152 |
| 4,753,764 | 6/1988 | Kamijo et al. | 501/88 |
| 4,784,686 | 11/1988 | Meek et al. | 75/0.5 AC |
| 4,810,846 | 3/1989 | Holcombe et al. | 219/10.55 R |
| 4,880,578 | 11/1989 | Holcombe et al. | 264/25 |
| 4,938,673 | 7/1990 | Adrian | 419/23 |
| 4,942,278 | 7/1990 | Sheinberg et al. | 219/10.55 M |
| 5,010,220 | 4/1991 | Afté et al. | 219/10.55 M |

OTHER PUBLICATIONS

W. H. Sutton, "Microwave Processing of Ceramic Materials," *Ceramic Bulletin*, vol. 68, No. 2, 376-386, 1989.
C. E. Holcombe, et al. "Enhanced Thermal Shock Prop. of $Y_2O_3$-2 Wt % $ZrO_2$ Heated Using 2.45 GHz Radiation," Mat. Res. Soc. Symp. Proc., vol. 124, 227-234, 1988.
C. E. Holcombe, "New Microwave Coupler Material," Am. Ceram. Soc. Bul, vol. 62, No. 12, 1388, 1983.
C. E. Holcombe, et al., "Unusual Properties of Microwave-Sintered Yttria-2 wt % Zirconia," J. Mat. Sci. Let. 7 (1988) 881-884.

*Primary Examiner*—Bruce A. Reynolds
*Assistant Examiner*—Tu Hoang
*Attorney, Agent, or Firm*—Joseph A. Marasco; Ivan L. Ericson; Harold W. Adams

[57] ABSTRACT

A method of sintering ceramic materials following: A compacted article comprising inorganic particles coated with carbon is provided, the carbon providing improved microwave coupling. The compacted article is then heated by microwave radiation to a temperature and for a period of time sufficient to sinter the compacted article.

12 Claims, No Drawings

METHOD OF SINTERING MATERIALS WITH MICROWAVE RADIATION

The United States Government has rights in this invention pursuant to contract no. DE-AC05-84OR21400 between the United States Department of Energy and Martin Marietta Energy Systems, Inc.

FIELD OF THE INVENTION

The present invention relates to methods, or processes, of sintering materials with microwave radiation energy, and more particularly, to a method of sintering materials which have poor microwave coupling characteristics by including additives which improve microwave heating. The invention also relates to microwave sinterable compositions, and more particularly, to microwave sinterable compositions comprising a mixture of particles of a ceramic material and an organic material which decomposes to form a carbon residue.

BACKGROUND OF THE INVENTION

Microwave radiation is becoming of increasing importance as a very efficient and effective tool for the heat treatment and sintering of materials such as refractory metal oxides. Microwave radiation very efficiently and rapidly heats oxide materials to the relatively high temperatures required for sintering. Also, microwave radiation penetrates the particulate mass of oxide material to provide a more uniform sintering of the oxide material than heretofore realized with the relatively non-uniform beat up provided by conventional furnaces. However, in spite of many advantages, it has been found that there are some problems attendant with the use of microwave radiation for sintering of many oxide materials due to their being essentially transparent or noncoupling with microwave radiation even at relatively high frequencies of up to about 2.45 GHz at temperatures in a range of about room temperature up to about 900° C.

In order to effect the sintering of such oxide materials with microwave radiation, materials capable of absorbing or coupling with microwave radiation such as boron carbide, silicon boride, titanium nitride, or uranium oxide were previously admixed with the particulate oxide material to permit the sintering of the oxide material with microwave radiation. In these instances the additive couples to the microwave radiation, transferring heat to the surrounding particulates of oxide material by contact and/or convection. This heating continues until the oxide material reaches a temperature of several hundred degrees centigrade where high frequency relaxation mechanisms such as ionic conduction and molecular vibrations occur in the oxide material. These relaxation mechanisms cause the oxide material to couple or absorb microwave radiation so that the oxide material can be heated thereby to the desired sintering temperature.

While the addition of coupling material to the body of oxide particulates forming a compact to be sintered has proven to be useful for the microwave heating of oxide materials from room temperature up to the temperature where the oxide materials couple with the microwave radiation, the purity of the sintered oxide materials may be compromised by the presence of the added coupling material. Further, the properties and characteristics of the sintered oxide material with this added impurity are often altered sometimes deleteriously.

OBJECTS OF THE INVENTION

Accordingly, it is an object of the present invention is to provide an improved method of coupling materials to microwave radiation.

Further and other objects of the present invention will become apparent from the description contained herein.

SUMMARY OF THE INVENTION

In accordance with one aspect of the present invention, a method of sintering a material with microwave radiation comprises the steps of:

(a) providing a compacted article comprised of inorganic particles coated with carbon; and (b) heating the compacted article with microwave radiation to a temperature and for a period of time sufficient to sinter the compacted article.

In accordance with another aspect of the present invention, a method of sintering a material with microwave radiation comprises the steps of:

(a) providing a mixture comprised of particles of a ceramic material and an organic material which decomposes to form a carbonaceous residue;

(b) heating the mixture in an inert atmosphere at a temperature and for a period of time sufficient to carbonize the organic material to form an intermediate material;

(c) compacting the intermediate material to form a compacted article; and, (d) heating the compacted article by microwave radiation in an inert atmosphere at a temperature and for a period of time sufficient to sinter the compacted article to a density equal to or greater than about 95% of theoretical density.

In accordance with a further aspect of the present invention, a method of sintering a material with microwave radiation comprises the steps of:

(a) providing a slurry comprised of particles of a ceramic material, a polar liquid medium, nitrates of a sintering aid, and an organic resin;

(b) evaporating the slurry to dryness to form a powder, the powder comprising the particles having a coating thereon, the coating comprising the organic resin and sintering aid nitrates;

(c) heating the powder in an inert atmosphere at a temperature and for a period of time sufficient to decompose the sintering aid nitrates in the coating of the coated particles to form an initially treated powder;

(d) heating the initially treated powder in an inert atmosphere at a second temperature and for a second period of time sufficient to carbonize the organic resin in the coating of the coated particles to form a second treated powder;

(e) compacting the second treated powder to form a compacted article;

(f) heating the compacted article by microwave radiation in an inert atmosphere at a third temperature and for a third period of time sufficient to volatilize and vaporize the carbonized organic resin; and (g) heating the compacted article by microwave radiation in an oxygen containing atmosphere at a fourth temperature and for a fourth period of time sufficient to sinter the compacted article to a density equal to or greater than about 95% of theoretical density.

In accordance with another aspect of the present invention, a microwave sinterable composition is comprised of particles of a ceramic material which has poor microwave coupling characteristics and a microwave heating promoter material which decomposes upon heating to form a carbonaceous residue.

For a better understanding of the present invention, together with other and further objects, advantages and capabilities thereof, reference is made to the following disclosure and appended claims.

DETAILED DESCRIPTION OF THE PREFERRED EMBODIMENTS

The invention provides new and useful compositions and methods of sintering materials with microwave radiation. The compositions and related method operations for preparing new and useful ceramic articles are presented now in detail.

The subject method is particularly suitable for, but not limited to, particulate ceramic materials which have poor microwave coupling characteristics, especially at room temperature. These materials include mullite, calcium aluminates, spinels, calcia, magnesia, baria, strontia, alumina, yttria, silica, calcium fluoride, yttrium fluoride, lanthanum fluoride, lithium fluoride, yttrium oxyfluoride, boron nitride, aluminum nitride, silicon nitride, sialons, or mixtures of any of these materials. A material which has poor microwave coupling characteristic at room temperature can generally be defined as a material that, when formed into an article which has a diameter of about 1 inch and a thickness of about 0.5 inches, requires a period of time longer than about 10 minutes to heat from room temperature to about 700° C. degrees centigrade when exposed to about 2.45 GHz microwave radiation at about 0.8 to about 12 Kw of power. The particles may be granular, spherical or another shape; the shape of the individual particles does not appear to be of any unexpected significance.

The ceramic material is blended with a solvent mixture containing a microwave heating promoter material, preferably phenolic resin, furan resin, sugar, cellulose, gelatin, starch, or mixtures thereof. These materials are added to the ceramic materials to improve microwave heating characteristics. Table I further describes these promoter materials. The microwave heating promoter materials are preferably thermoplastic, and melt when heated. Therefore, the microwave heating promoter material may be blended with the ceramic material by milling in a dry state, without the use of a solvent. However, the use of a solvent is preferable because the mixture becomes more homogeneous and the microwave heating promoter is much more uniformly coated onto the particulate material, which is conducive a more uniform microwave heating of the ceramic material. Conventional sintering aids may also be included in the method, depending on the ceramic materials selected.

TABLE I

| Material | Soluble in Water | % Carbon Char Residue |
|---|---|---|
| Phenolic Resin | No | 40.4 |
| Furan Resin | No | 31.1 |
| Sugar | Yes | 23.4 |
| Microcrystalline Cellulose | Yes | 27.1 |
| Porkskin-type Gelatin | Yes | 24.9 |
| Starch | Yes | 20.7 |

The solvent, if used, is evaporated and driven from the blend of particulate material and solvent mixture by a conventional method, usually involving a heating step, leaving the particulate material coated with the microwave heating promoter, and sintering aids, if used.

Using conventional heating, the components in the coatings deposited on the particulate material are partially decomposed, or, more specifically, partially carbonized. This step can be performed in an ambient atmosphere, but an inert atmosphere or vacuum is preferable because temperatures over 500° C. in air will eventually oxidize away the microwave heating promoter.

Methods of sintering materials with microwave radiation in accordance with the invention generally comprise the following operations:

1. Blending a particulate material selected from the nitrides, oxides, and oxynitrides of aluminum, silicon, and yttrium or other material which has poor microwave coupling characteristics with a solvent mixture containing a carbonaceous material or with a powder of carbonaceous material, and sintering aids, if required;

2. evaporating the solvent from the blend of particulate material and solvent mixture if such a solvent is used, leaving the particulate material coated with the carbonaceous material and sintering aids;

3. thermally decomposing the components in the coatings deposited on the particulate material;

4. thermally carbonizing the carbonaceous material and partially volatilizing the decomposed products of the components in the coatings deposited on the particulate material;

5. consolidating the carbon-coated particulates into an article with pressure;

6. converting the carbon coating on the particulate material to volatile species, then vaporizing the volatile species from the particulate material with heat generated by absorption of microwave radiation; and 7. sintering the carbon free particulates in the consolidated article with heat generated by absorption of microwave radiation.

The time, temperature, and/or other parameters required for various steps in the method will fie expected to vary according to the size, shape, specific composition, and/or other properties of the article or other components involved in the method steps. Parameters may also be affected by variations in equipment used or in other conditions present in the process environment. As all given factors are taken into consideration, parameters may be expected to vary by up to 25%, or more in some cases. Therefore, the term "sufficient" and its derivatives are used herein to indicate expected allowances for these variations.

EXAMPLE I

In a demonstration of the subject method, 100 grams of yttrium oxide powder were slurried in a 20-gram aliquot of a blended mixture containing 7.0 grams of phenolic resin with a carbon yield of 40.4 wt.% and 93 grams of ethanol. The ethanol was evaporated from the slurry, leaving dry, resin-coated, yttrium oxide particulates. These particulates were heated for about 3 hours in an argon atmosphere to a temperature of about 500° C., then held at this temperature for about 1 hour to decompose the coating of phenolic resin. Next, the particulate material was heated over a period of about 2 hours to a temperature of about 1000° C. in an argon atmosphere and held at that temperature for about 1 hour to carbonize the coating on the particulate material. The carbon-coated particulates were pressed into pellets with a pressure of about 20,000 psi. The pellets were loaded into a conventional microwave oven and heated over a period of about 10 minutes to a temperature of about 1000° C. in argon, then the atmosphere in the oven was changed to air and the pellets were heated over a period of about 20 minutes to a temperature of about 1800° C. in the air atmosphere with the microwave radiation produced by the 2.45-GHz magnetron in the oven at the 1.6 Kw power level. The temperature of about 1800° C. was maintained for about 30 minutes.

An examination of pellets indicated that the pellets had been sintered to a density of 5 g/cm³ and chemical analyses indicated that the pellets contained 100 wt. % of yttrium oxide and no carbon. The examination and chemical analyses indicated that the pellets of yttrium oxide had been sintered fully dense, and the carbon coatings on the particles of yttrium oxide in the pellets had been oxidized at about 1000° C. with the heat produced by microwave radiation.

EXAMPLE II

In another demonstration of the subject method, 100 grams of aluminum oxide powder were processed as described in Example I.

An examination of the sintered pellets indicated a density of 4 g/cm³ (fully dense), and chemical analyses indicated that the pellets contained essentially 100 wt. % alumina and relatively no carbon.

EXAMPLE III

In a further demonstration of the subject method, 100 grams of silicon nitride particles were slurried in a blended mixture containing 66.2 grams of ethanol, 20.35 grams of yttrium nitrate, 14.71 grams of aluminum nitrate, and 2.8 grams of a phenolic resin. The liquid was evaporated from the slurried mixture, leaving a dry powder of coated particulates. This powder was slowly heated for about 3 hours in an argon atmosphere to a temperature of about 500° C. and held at this temperature in the argon atmosphere for about 1 hour to decompose the nitrate components in the coating on the particulates. The powder was then heated for about 2 hours in an argon atmosphere to a temperature of about 1000° C. and held at the temperature of about 1000° C. in the argon atmosphere for about 1 hour to carbonize the phenolic resin on the particulate material. The carbon-coated particles were pressed into pellets with a pressure of about 20,000 psi. These pellets were loaded into a conventional microwave oven and heated over a period of about 15 minutes to a temperature of about 1700° C. in an atmosphere of nitrogen with the microwave radiation available from the 2.45-GHz magnetron in the oven at the 1.6 Kw power level. The temperature of about 1700° C. was maintained for about 15 minutes.

Examination of the pellets indicated that they were sintered to a density of 3 g/cm³; and chemical analyses indicated that the pellet contained essentially no carbon or silica, 92 wt. % of silicon nitride, 6 wt. % of yttrium oxide and 2 wt. % of aluminum oxide. The examination and chemical analyses indicated that the pellets were sintered and that the carbon had been volatilized from them.

In the present invention, the sinterable material is initially heated by the microwave radiation absorbed in the carbon coatings on the sinterable material in an argon atmosphere. After the sinterable material is heated to temperatures in the range of 800° to 1000° C., the coupling characteristics of the sinterable material are changed by high frequency relaxation mechanisms such as ionic conduction and molecular vibrations. As a result, the microwave radiation is absorbed by the sinterable material. The sinterable material is then heated to the higher temperatures required for sintering the material by this absorbed radiation. The carbon coating on the sinterable material is converted to volatile carbon oxides at these higher temperatures with the oxygen in the air atmosphere. Consequently, the sintered product is relatively free of carbon.

The application of carbon as a coupling agent initiates a reaction with the thin films of oxides usually found on particulates; more specifically on particulates of nitrides. As a result, these oxides are converted to volatile species. For example, silicon dioxide plus carbon is changed to silicon monoxide and carbon monoxide. These reaction products are volatilized from the thin oxide films, leaving sinterable particulates in the consolidated article.

While there has been shown and described what is at present considered the preferred embodiments of the invention, it will be obvious to those skilled in the art that various changes and modifications may be made therein without departing from the scope of the invention as defined by the appended claims.

What is claimed is:

1. A method of sintering a material with microwave radiation comprising:
   (a) providing a compacted article comprising inorganic particles coated with microwave absorbent carbon, said inorganic particles having poor microwave coupling characteristics at about room temperature, said microwave absorbent carbon being microwave absorbent at room temperature; and
   (b) irradiating said compacted article with microwave radiation to heat said compacted article by microwave absorption of said microwave absorbent carbon coated on said compacted article to a temperature sufficient for said inorganic particles in said compacted article to absorb said microwave radiation and for a period of time sufficient to sinter said compacted article and to remove said microwave absorbent carbon coated on said compacted article.

2. A method in accordance with claim 1 wherein said irradiating in step (b) comprises heating to about 1700° C. by microwave radiation available from a 2.45 GHz magnetron at about 1.6 Kw power level.

3. A method in accordance with claim 1 wherein said step (a) further comprises the steps of:
   (a) providing a slurry comprising particles of a ceramic material, a polar liquid medium, a sintering aid nitrate, and an organic microwave heating promotor material;
   (b) evaporating said slurry to dryness to form a powder, said powder comprising said particles having a coating thereon, said coating comprising said sintering aid nitrate and said organic microwave heating promoter material;
   (c) heating said powder in an inert atmosphere at a temperature and for a period of time sufficient to decompose said sintering aid nitrate in said coating of said coated particles to form an initially treated powder;
   (d) heating said initially treated powder in an inert atmosphere at a second temperature and for a second period of time sufficient to carbonize said organic microwave heating promoter material in said coating of said coated particles to form a second treated powder; and (e) compacting said second treated powder to form a compacted article comprising inorganic particles coated with carbon.

4. A method in accordance with claim 1 wherein said inorganic particles comprise silicon nitride.

5. A method in accordance with claim 3 wherein said polar liquid medium comprises ethanol.

6. A method in accordance with claim 3 wherein said sintering aid nitrate comprises yttrium nitrate and aluminum nitrate.

7. A method in accordance with claim 3 wherein said organic microwave heating promoter material comprises a material selected from the group consisting of phenolic resin, furan resin, sugar, cellulose, gelatin, starch, and mixtures thereof.

8. A method in accordance with claim 3, wherein said inert atmosphere coprises nitrogen, a noble gas, or mixtures thereof.

9. A method in accordance with claim 3 wherein said heating in step(c) further comprises slowly heating for about 3 hours to about 500° C. then holding said temperature for about one hour.

10. A method in accordance with claim 3 wherein said heating in step (d) further comprises slowly heating for about 2 hours to about 1,000° C. then holding said temperature for about one hour.

11. A method in accordance with claim 3 wherein said compacting in step (c) comprises pressing said second treated powder into pellets with a pressure of about 20,000 psi.

12. A method in accordance with claim 3 wherein said period of time in step (c) is no more than about one hour, and wherein the density of said compacted article is at least about 3.0 g/cm$^3$.

* * * * *